(12) United States Patent
Bhanutej

(10) Patent No.: US 12,379,765 B2
(45) Date of Patent: Aug. 5, 2025

(54) CORE STATUS MANAGEMENT AT POWER FAILURE

(71) Applicant: Intel Corporation, Santa Clara, CA (US)

(72) Inventor: Soma Bhanutej, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 17/686,976

(22) Filed: Mar. 4, 2022

(65) Prior Publication Data

US 2022/0187900 A1    Jun. 16, 2022

(51) Int. Cl.
| | | |
|---|---|---|
| G06F 1/32 | (2019.01) | |
| G06F 1/30 | (2006.01) | |
| G06F 1/3206 | (2019.01) | |
| G06F 1/3287 | (2019.01) | |

(52) U.S. Cl.
CPC .............. *G06F 1/3287* (2013.01); *G06F 1/30* (2013.01); *G06F 1/3206* (2013.01)

(58) Field of Classification Search
CPC ......... G06F 1/3287; G06F 1/3206; G06F 1/30
See application file for complete search history.

(56) References Cited

U.S. PATENT DOCUMENTS

| | | | | |
|---|---|---|---|---|
| 5,428,252 A | * | 6/1995 | Walker .................... | H02J 9/061 307/64 |
| 9,389,665 B1 | | 7/2016 | Hagen | |
| 2006/0069931 A1 | * | 3/2006 | Shin ...................... | G06F 1/3203 713/300 |
| 2015/0355699 A1 | * | 12/2015 | Castro-Leon ......... | G06F 1/3206 713/323 |

OTHER PUBLICATIONS

Extended European Search Report mailed Jul. 21, 2023 for European Patent Application No. 23152998.3, 9 pages.
"Advanced Configuration and Power Interface (ACPI) Specification", Jan. 2021, 1087 pages, version 6.4.
Intel, "eADR: New Opportunities for Persistent Memory Applications", Jan. 15, 2021, 4 pages.
S. Scargall, "Chapter 2: Persistent Memory Architecture", 2020, 20 pages.
"Arm® CoreLink™ GIC-600 Generic Interrupt Controller," Revision: r1p6, Technical Reference Manual, Arm, 2016-2019, 216 pages. (See Sec. 2.6, "Wake Request," p. 2-43.).

* cited by examiner

*Primary Examiner* — Stefan Stoynov
(74) *Attorney, Agent, or Firm* — HANLEY, FLIGHT & ZIMMERMAN, LLC

(57) ABSTRACT

Embodiments herein relate to a power control unit (PCU) of an electronic device. The PCU may be configured to receive a power failure interrupt from an interrupt control block of the electronic device. The power failure interrupt may be generated based on or related to a power failure of the electronic device. In response to receipt of the power failure interrupt, and when a threshold number of processor cores related to the power failure is different than a number of awake processor cores of a set of processor cores of the electronic device, the PCU may transition a subset of processor cores of the set of processor cores to an awake state or a sleep state so that the number of awake processor cores is same as the threshold number of processor cores. Other embodiments may be described and/or claimed.

20 Claims, 6 Drawing Sheets

CORE STATUS MANAGEMENT AT POWER FAILURE

FIELD

The present application generally relates to the field of electronic circuits and, more specifically, to core status management at power failure, and associated apparatuses, systems, and methods.

BACKGROUND

In legacy systems, upon the event of a power failure, the system may cause all processor cores of the system to wake from a deep sleep (e.g., a C6) state to an awake state (e.g., a C0) state. Such a wake operation may result in significant power consumption, and take a non-negligible amount of time to be completed.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
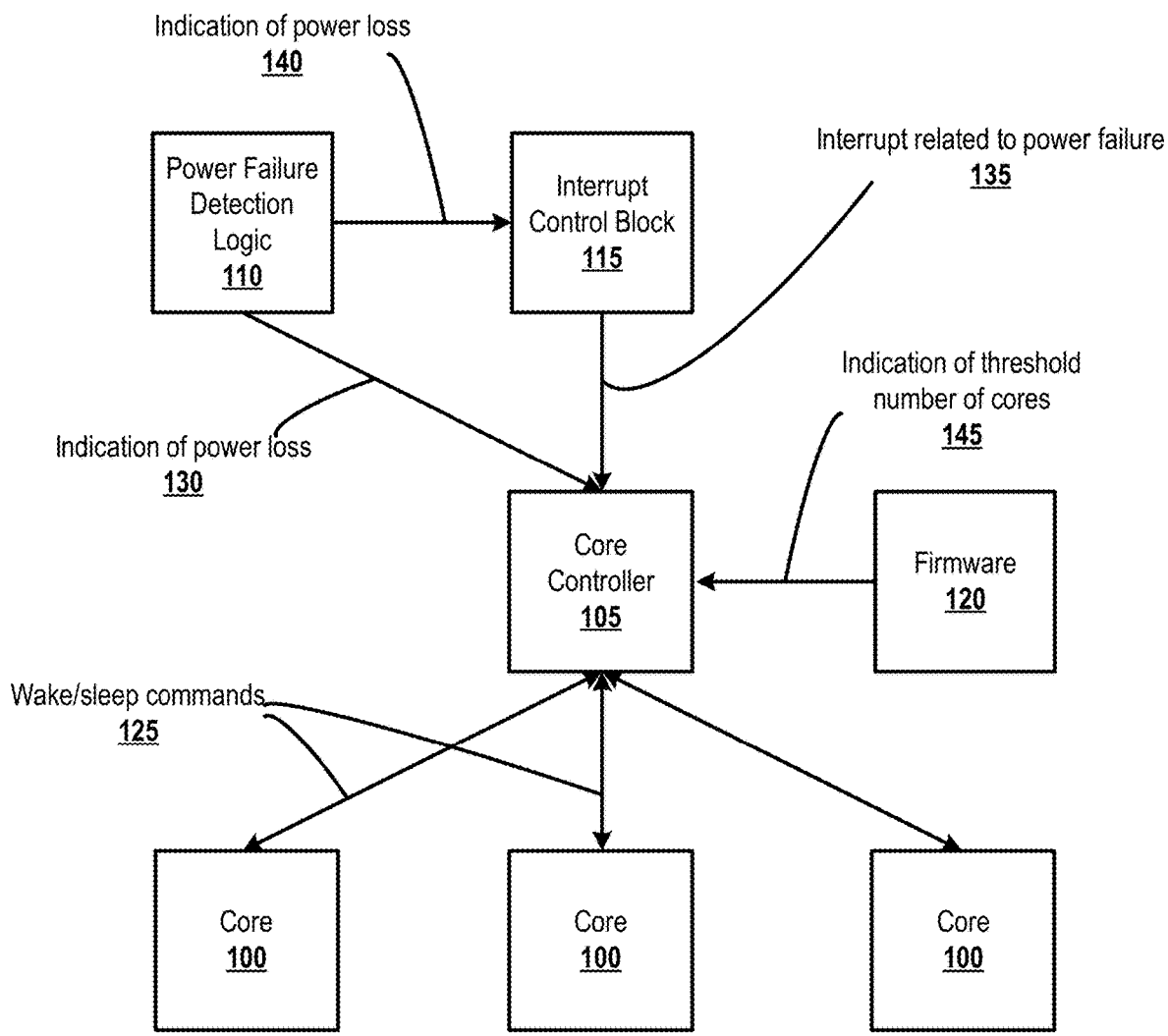
FIG. 1 illustrates an example block diagram of elements of an electronic device, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As noted, in legacy systems, upon the event of a power failure, the system may cause processor cores of the system to wake from a deep sleep state (e.g., the C6 state as defined by the Unified Extensible Firmware Interface (UEFI) Forum, "Advanced Configuration and Power Interface (ACPI) Specification," version 6.4 (January 2021) ("[ACPI]"), which is hereby incorporated by reference in its entirety) to an awake state (e.g., the C0 as defined by [ACPI]). Such a wake operation may result in significant power use, as well as take a non-negligible amount of time.

By contrast, in embodiments herein, an interrupt control logic may be used to prevent un-necessary cores from going from a sleep state to the awake state when the server detects power failure of a primary power source. Specifically, control logic in the system may ensure that only a subset of the cores are moved to the awake C0 state when the power failure is detected. Additionally or alternatively, if all cores are awake (or more cores are awake than are desired or survivability actions), then a subset of those cores may be put into the sleep state while the remainder are kept in the awake state.

This process may be contrasted with legacy techniques described above wherein all cores are awoken to the C0 state, and then a subset of the awoken cores are put back into a low power or sleep state. As described above, waking all cores may be costly from a power standpoint as well as a time standpoint.

Embodiments herein may provide a number of advantages such as reducing the power requirements on a backup power source due to less cores being awoken at power failure.

FIG. 1 illustrates a block diagram of elements of an example electronic device, in accordance with various embodiments. The embodiment of FIG. 1 is intended as a high level example that shows various elements of the electronic device and their inter-relations. In various implementations, some or all of the elements may be part of the same physical structure (e.g., the same Application-Specific Integrated Circuit (ASIC), System-on-Chip (SoC), Multi-Chip Package (MCP), a System-in-Package (SiP), Field-Programmable Gate Array (FPGA), processor, multi-core processor, and the like), or may be distributed across a plurality of physical structures. For example, the electronic device or platform may be a motherboard, ASIC, SoC, MCP, SiP, FPGA, or other like device included in a complete computing system such as a server (e.g., blade, rack-mount, etc.), edge compute node, workstation, desktop computer, laptop or notebook computer, networking device (e.g., network switch, router, modem, bridge, gateway, network appliance, or the like), a smartphone, a wearable device, an internet of things (IoT) device, a networked appliance, and/or other like computer systems.

In some implementations, the electronic device may be, be part of, or include a device such as a network node, for example, a router, switch, hub, and/or some other that provides an entry point to a network. Additionally or alternatively the electronic device may be, be part of, or include an edge compute node such as, for example, a Multi-access Edge Computing (MEC) server, 3GPP System Aspects Working Group 6 (SA6) Architecture for enabling Edge Applications (see e.g., 3GPP TS 23.558 v17.2.0 (2021 Dec. 31), 3GPP TS 23.501 v17.3.0 (2021 Dec. 31)), Intel® Smart Edge Open framework, formerly known as OpenNESS (see e.g., Intel® Smart Edge Open Developer Guide, version 21.09 (30 Sep. 2021)), Content Delivery Networks (CDN) nodes; Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (CO-MAC) systems, a near-real-time or non-real-time RAN Intelligent Controller (RIC) as defined in Open RAN (O-RAN) Alliance standards, and/or the like. More generally, the electronic device may be used in a context wherein there is an advantage for data present in volatile memory to be preserved in an unexpected power-failure scenario.

In some embodiments, various of the elements such as the power failure detection logic 110, interrupt control block 115, core controller 105, and the like. may be implemented as hardware, software, firmware, or some combination thereof. Real-world embodiments may have more or fewer elements than are depicted (e.g., certain of the elements may be combined in some embodiments), or elements that are arranged to have additional signals communicated than are depicted in FIG. 1. Other embodiments may likewise vary.

In embodiments, the architecture of FIG. 1 may include a plurality of processor cores 100. The processor cores 100 may be, for example, individual processors, cores of a multi-core processor, or some other type of processor cores. It will be understood that even though only three processor cores 100 are depicted in FIG. 1, other embodiments may have more or fewer processor cores. For example, some real-world embodiments may have between approximately 20 and 132 cores, dependent on the specific product, the use case to which that product will be put, power requirements related to the processor(s) and/or processor core(s), etc. Other real-world embodiments may have more or fewer processor cores.

The processor cores 100 may be communicatively coupled with a core controller 105, which may also be referred to as a power control unit (PCU). The core controller 105 may be configured to, among other things, control the power state of the processor cores 100. For example, the core controller 105 may be configured to put the various processor cores 100 into an awake state (e.g., the C0 power state), a deep sleep state (e.g., the C6 power state), or some other power state through the use of wake/sleep commands at 125. In some embodiments, the core controller 105 may be configured to receive data from the processor cores 100 such as status updates that indicate a functional state, a wake/sleep state, or some other state or process of the processor cores 100.

The core controller 105 may further be communicatively coupled with an interrupt control block 115 and a firmware 120, as shown. In some embodiments, the firmware 120 may be a basic input/output system (BIOS). In another embodiment, the firmware may be or be related to an ACPI-related element, a UEFI-related element, or some other firmware element. The firmware 120 may be configured to provide one or more elements of data to the core controller 105 for use by the core controller 105 in directing the power state of the various processor cores 100. Such data may be, for example, an indication of a threshold number of processor cores as indicated at 145. The indication at 145 may be, for example, some pre-configured value that is programmed by a user of the electronic device and stored in the firmware 120. The interrupt control block 115 may be configured to provide an interrupt at 135 to the core controller 105. The interrupt at 135 provided by the interrupt control block 115 may be configured to cause the core controller 105 to change the power state of the various processor cores 100. Specifically, in FIG. 1, the interrupt control block 115 is depicted as provided an interrupt related to an impending power failure of the system at 135.

Figure 3:
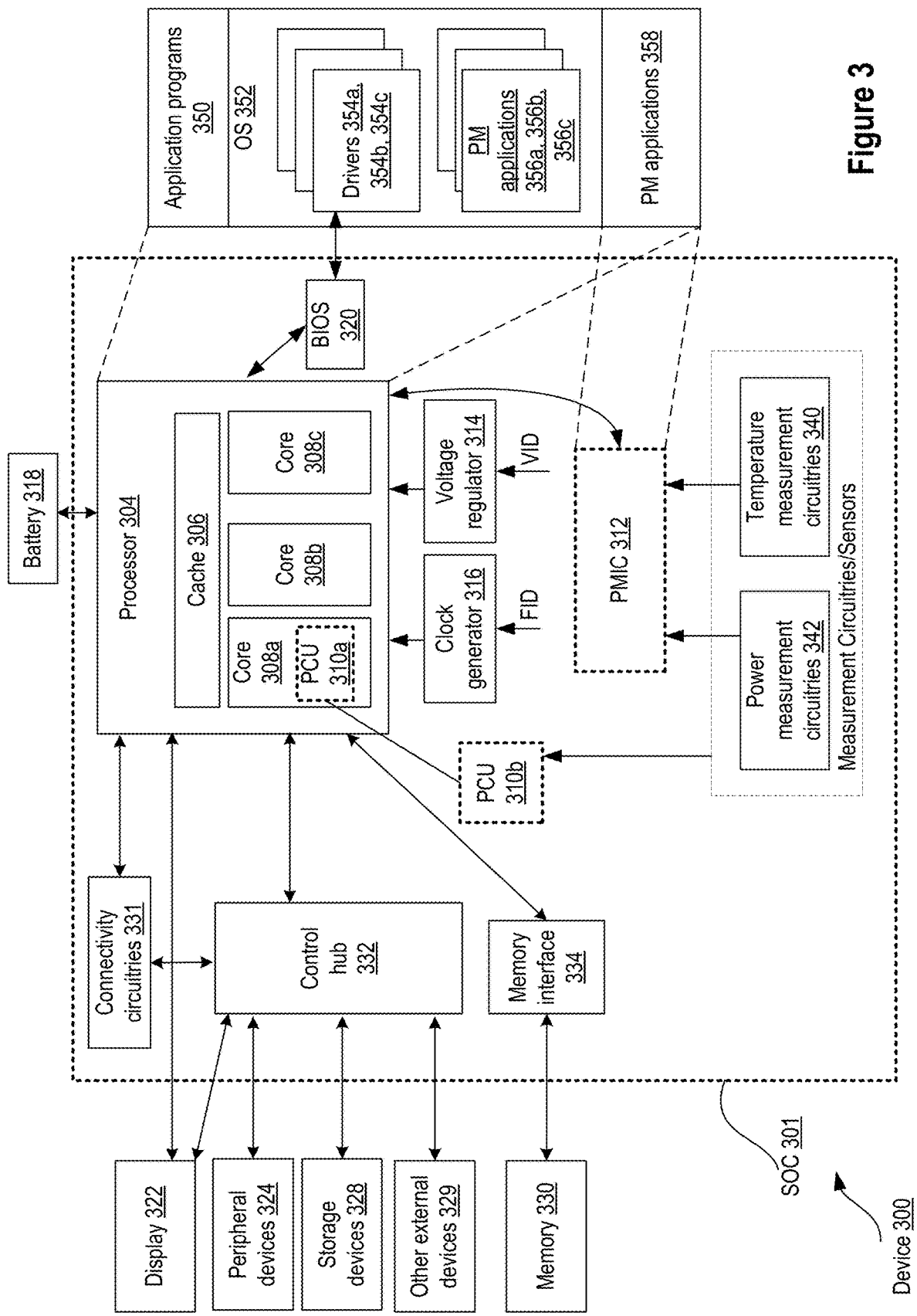
FIG. 3 illustrates a smart device or a computer system or a System-on-Chip (SoC) with apparatus and/or software for analysis or correction of duty-cycle issues, in accordance with some embodiments.

The architecture may further include power failure detection logic 110 (which may be similar to, for example, power measurement circuitries 342 of FIG. 3 or some other element of FIG. 3). The power failure detection logic 110 may be configured to identify an impending power failure (e.g., a power failure that is related to or caused by an issue with a primary power source of the electronic device such as a failure of the power source, failure of a power connection to that power source (e.g., an electrical connection to a wall outlet), or some other power failure). The power failure detection logic 110 may be configured to provide an indication of that power loss to one or both of the interrupt control block 115 and core controller at 140 and 130, respectively. The indication of the power loss may be a part of an asynchronous survivability flow. Here, a survivability flow may include, for example, flushing cache (e.g., last level cache (LLC) and informing the board's memory controller to keep dual inline memory modules (DIMMs) in a self refresh mode. Examples of survivability flows include asynchronous dynamic random access memory (DRAM) refresh ("ADR"), enhanced ADR (eADR), and the like. ADR is a feature that flushes write-protected data buffers and places the DRAM in self-refresh during a power loss event or system crash to ensure the data is in a safe and consistent state on persistent memory. Additional details of ADR and/or eADR are discussed in Intel Corp., *eADR: New Opportunities for Persistent Memory Applications,* INTEL.COM (15 Jan. 2015), https://www.intel.com/content/www/us/en/developer/articles/technical/eadr-new-opportunities-for-persistent-memory-applications.html, and Steve Scargall, *Persistent Memory Architecture,* in PROGRAMMING PERSISTENT MEMORY, Ch. 2, pp. 11-30 (11 Jan. 2020), the contents of each of which are hereby incorporated by reference in their entireties. For purposes of the present disclosure, the term "ADR" as used herein may refer to both "ADR" and "eADR" even though these terms may refer to different concepts.

More generally, a "survivability flow" may relate to a process flow that is performed during system power failure, and which relates to suspending input/output (I/O) traffic from various interconnect links such as peripheral component interconnect express (PCIe) links, compute express link (CXL) links, etc. The process flow may further relate to stopping processor core execution, flushing I/O and/or central processing unit (CPU) caches, persistent memory storage, and the like. In some embodiments, the survivability flow may additionally or alternatively include architectural register state dump or stacking/heaping memory sections into persistent system memory.

An ADR flow is triggered when a main power-supply has been cut-off due to an unexpected power outage or system failure. This means that the entire ADR flow is performed using backup power. In existing systems such as General Parallel File System (GPFS) Native RAID (GNR) implementations, all cores are powered ON to the awake state (e.g., the C0 power state) as soon as a power failure is detected. To power ON all of the cores 100 that are in the deep sleep state (e.g., the C6 power state) a relatively large back-up battery or large amount of power is required, which may or may not be available depending on the parameters of the backup power source. Additionally, ADR flow completion usually takes a relatively long time to complete, which could contribute to additional power consumption. Generally, the ADR flow may be used to provide an indication of an impending power failure. Upon notification of the impending power failure, it may be desirable to perform what is known as a "survivability function" to avoid data loss or damage to the electronic device.

One element of the survivability function may be to direct a backup power source to provide backup power to at least some elements of the electronic device (e.g., the core controller 105, the processor cores 100, and/or some other element). The backup power source may be, for example, a battery (e.g., battery 318 of FIG. 3), a super-capacitor of a power supply unit (PSU), or some other backup power source. Additionally, it may be desirable for some number of the processor cores 100 to perform one or more survivability functions such as LLC control, a cache flush, memory controller management, a memory refresh function, and/or some other functions. However, as noted, the survivability functions of legacy systems may have been time and/or power consuming because they would require all cores of the electronic device to first be woken up, and then a subset of those cores would be put back to sleep.

By contrast in embodiments herein, the core controller may be configured to only awaken a subset of the processor cores 100 of the electronic device (e.g., if more processor cores 100 are asleep at the time of the power failure than the threshold number of cores indicated by indicator 145), or to put a subset of already-awake processor cores 100 to sleep (e.g., if more processor cores 100 are awake at the time of the power failure than the threshold number of cores indicated by indicator 145).

More generally, in operation, the power failure detection logic 110 may identify the presence of an impending power loss to the system. In response, the power failure detection logic 110 may generate and send an power loss indicator 140 to the interrupt control block 115. The interrupt control block 115 may generate, based on the indicator 140, a power failure interrupt 135 and transmit that interrupt 135 to the core controller 105.

Based on the interrupt 135, the core controller 105 may identify the threshold number of cores in the indication 145 received from the firmware 120. In one embodiment, the indication 145 may be a result of a "pull" or request operation from the core controller 105 to the firmware 120. Additionally or alternatively, the indication 145 may be provided by the firmware 120 upon system boot. Additionally or alternatively, the indication 145 may be the result of identification by the firmware 120 of an impending power failure (e.g., if the power failure detection logic 110 provides such an indication to the firmware 120), and may be a "push" action.

Based on the interrupt 135 and the indication 145, the core controller 105 may identify the power state of the various processor cores 100 and identify whether a subset of the processor cores 100 should be woken up or put to sleep via the wake-sleep commands 125 as indicated above. As noted, this process may be different than that performed in legacy systems where all processor cores 100 are woken up first. In this way, significant power and/or time savings may be realized because additional wake/sleep steps may be avoided.

In some embodiments, the power failure detection logic 110 may further provide a power loss indicator 130 to the core controller 105. Based on this indication 130, the core controller 105 may enact further time/power savings by blocking (or declining to process) one or more interrupts that are not related to the survivability flow (e.g., interrupts other than interrupt 135). Examples of such interrupts may be or include interrupts related to other requests to change a power state of one or more of the processor cores 100. By blocking these interrupts, additional process that are unrelated to the ADR flow may be skipped.

Figure 2:
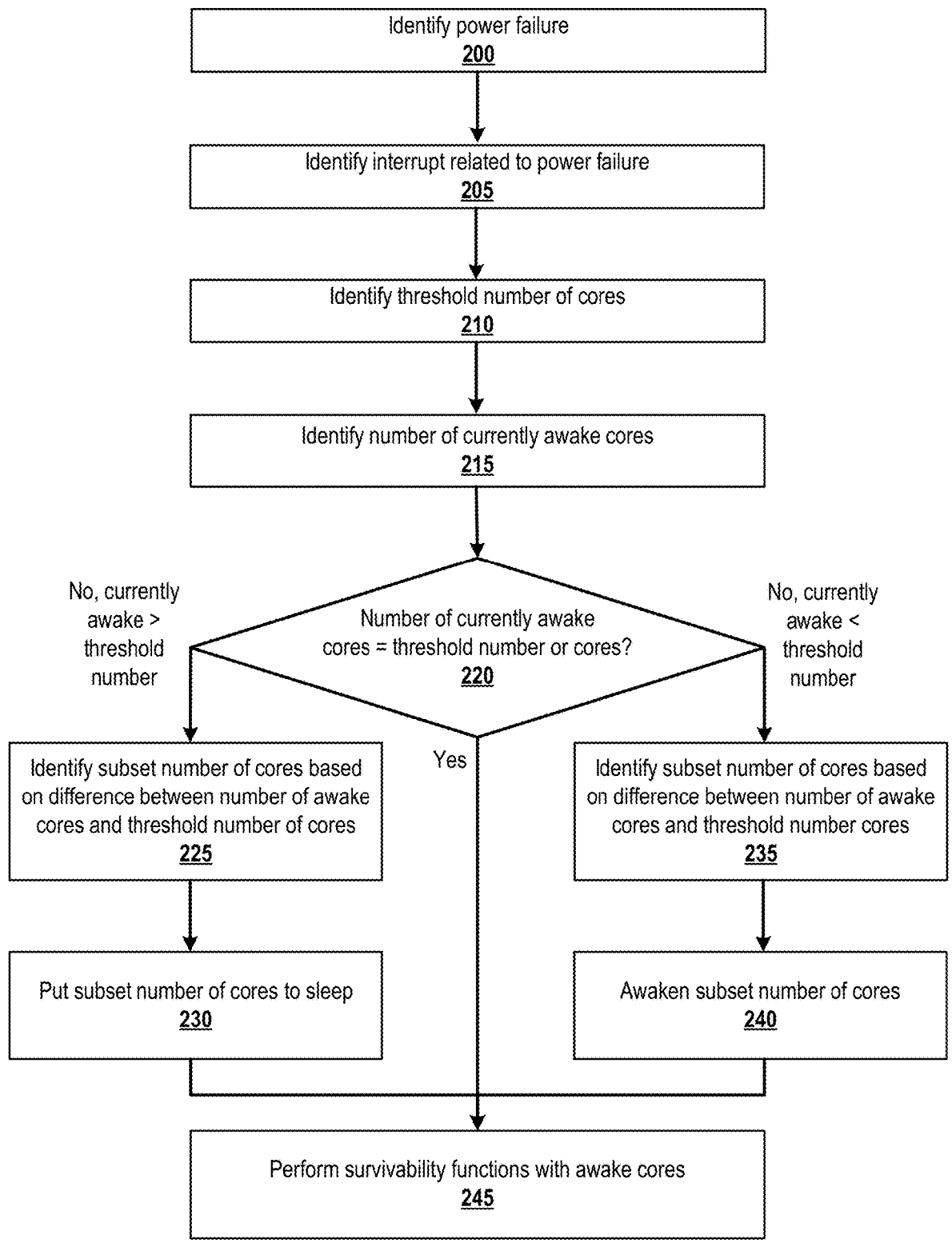
FIG. 2 illustrates an example wake process, in accordance with various embodiments.

FIG. 2 illustrates an example wake process, in accordance with various embodiments. In general, elements of the process in FIG. 2 may be performed by the core controller 105 of FIG. 1. However, in other embodiments, some other device or component may operate the process of FIG. 2.

The process begins at 200, where the core controller 105 identifies or determines an impending power failure, and at 205, the core controller 105 identifies or determines an interrupt related to the power failure. The identification of the impending power failure at 200 may be based on a power loss indicator 130 received from the power failure detection logic 110 in FIG. 1. The identification of the interrupt may be the power failure interrupt 135 in FIG. 1. In some embodiments where the indication of power loss indicator 130 is not transmitted, the interrupt 135 may additionally serve as the indication of power loss received at 200.

At 210, the core controller 105 identifies or determines a threshold number of cores 100. Such a threshold number may be the threshold number received in the indication 145 from the firmware 120. As noted previously, in some embodiments the threshold number may be received based on a "pull" action performed by the core controller 105, previously provided at system boot, or provided by the firmware 120 based on a "push" action.

At 215, the core controller 105 identifies or determines a number of currently awake processor cores 100. In some embodiments, this identification may be performed based on polling the processor cores 100 in response to the indication 130 and/or the interrupt 135. Additionally or alternatively, the identification may be based on updated data that is stored by the core controller 105 through normal operation of the core controller 105.

At 220, the core controller 105 identifies or determines whether the number of currently awake processor cores 100 is equal to the threshold number of processor cores 100. If the number of currently awake processor cores 100 is equal to the threshold number of processor cores 100, then the core controller 105 may proceed directly to 245 wherein the core controller 105 instructs or otherwise causes the awake processor cores 100 (e.g., the cores in the C0 state) to perform survivability functions such as LLC control, cache flush, memory controller management, and/or other like survivability functions.

If the number of currently awake cores 100 exceeds the threshold number of cores, then at 225, the core controller 105 identifies or determines a subset number of cores 100. The subset number of cores may be based on the difference between the number of awake cores and the threshold number of cores. In other words, the number of cores 100 in the subset may be equal to number of awake cores 100 minus threshold number of cores 100. The core controller 105 may put the number of cores in the subset to sleep at 230 (e.g., into the C6 power state), and proceed to 245. For example, if three more cores 100 are awake than are in the threshold number of cores, then the core controller 105 may put three cores 100 to sleep. In some embodiments, the cores 100 that are put to sleep may be based on one or more parameters of the core 100 itself or parameter(s) of one or more other cores 100 (e.g., a pre-defined or configurable selection parameter, the process(es) running on the core 100, the power consumption of the core 100, the address of the core 100, and/or any other like conditions or parameters of individual cores 100). These parameters may be used to prioritize which cores 100 are put to sleep or kept awake. Additionally or alternatively, the core controller 105 may select different cores 100 to place in the sleep state in order to achieve load balancing among the processor cores 100 (e.g., based on some load balancing criteria). Additionally or alternatively, the core controller 105 may pick a number of cores 100 at random or (or using a pseudorandom number of cores 100), and put those randomly selected cores 100 to sleep.

If the threshold number of cores exceeds the number of currently awake cores 100, then the core controller 105 may identify a subset number of cores 100 at 235 based on a difference between the number of awake cores 100 and the threshold number of cores. For example, the subset number of cores 100 may be equal to the threshold number of cores minus the number of awake cores 100. The core controller 105 may then awaken, at 240, the number of cores 100 in the subset (e.g., by placing the cores 100 in the subset into the C0 power state), and proceed at 245. Similarly to as described above, in some embodiments the cores 100 that are selected to be awaken may be based on one or more parameters related to the core 100 itself, one or more parameters of one or more other cores 100, one or more parameters of one or more other components of the electronic system/device, and/or the like, while in other embodiments the selection may be random or pseudorandom.

The process of FIG. 2 is intended as an example embodiment, and other embodiments may vary. For example, other embodiments may have more or fewer elements, elements arranged in a different order than depicted, and/or other variations.

Additionally, the examples described herein are described with respect to only two power states, namely C0 and C6. However, in various implementations, various cores 100 may be in other power states than C0 or C6, such as sleep and awake states defined by platform standards other than [ACPI]. In some embodiments, certain of these states may additionally count as "awake" or "not awake" states for the purpose of the determinations of operations 215 and 220. Additionally or alternatively, waking a core 100 at 240 or putting a core to sleep at 230 may be related to changing or transitioning from an intermediate power state (e.g., C2) to a C0 or C6 state, rather than only from a C0 state to a C6 state (or vice-versa). Additionally or alternatively, the intermediate power state (e.g., C2) may be used instead of the C0 or C6 state in some implementations. Additionally or alternatively, any state that meets the definition of a "sleep state" or an "awake state" may be used, even if redefined in future standards or specifications. Additionally or alternatively, the "awake" state or the "sleep" state may be defined with respect to a range of power states, power ranges, voltage states, voltage ranges, amperage (current) states, amperage (current) ranges, rather than only power states C0 or C6. In some implementations, the power, voltage, and/or amperage (current) states or ranges may be reconfigured per the needs of the platform. Additionally or alternatively, various aspects or parameters of any of the states used for the purposes of the present embodiments may be predefined or configurable for a specific platform and/or use case. Other embodiments may vary.

FIG. 3 illustrates a device 300, which may be a computer system, a SoC, MCP, SiP, and/or other like device or node with apparatus and/or software for power management, in accordance with some embodiments. The device 300 may correspond to the electronic device discussed previously with respect to FIG. 1, and elements discussed infra may correspond to various elements discussed previously with respect to FIG. 1.

In some embodiments, device 300 represents an appropriate computing device, such as a computing tablet, a mobile phone or smartphone, a laptop, a desktop, an IoT device, a server, a wearable device, a set-top box, a wireless-enabled e-reader, network appliance, an edge compute node, a smart device or smart appliance, or the like. It will be understood that certain components are shown generally, and not all components of such a device are shown in device 300. The apparatus and/or software for controlling wake sources in a system to reduce power consumption in sleep state can be in the wireless connectivity circuitries 331, PCU 310, and/or other logic blocks (e.g., operating system 352) that can manage power for the computer system. In some embodiments, one or both of PCUs 310*a* and/or 310*b* may be configured to operate as core controller 105.

In an example, the device 300 comprises an SoC 301. An example boundary of the SoC 301 is illustrated using dotted lines in FIG. 3, with some example components being illustrated to be included within SoC 301—however, SoC 301 may include any appropriate components of device 300.

In some embodiments, device 300 includes processor 304, which may correspond to one or more of the cores 100 in FIG. 1. Processor 304 can include one or more physical devices, such as microprocessors, application processors, microcontrollers, programmable logic devices, processing cores, or other processing means. The processing operations performed by processor 304 include the execution of an operating platform or operating system on which applications and/or device functions are executed. The processing operations include operations related to I/O (input/output) with a human user or with other devices, operations related to power management, operations related to connecting computing device 300 to another device, and/or the like. The processing operations may also include operations related to audio I/O and/or display I/O.

In some embodiments, processor 304 includes multiple processing cores (also referred to as cores) 308a, 308b, 308c, which may be similar to processor cores 100. Although merely three cores 308a, 308b, 308c are illustrated in FIG. 3, processor 304 may include any other appropriate number of processing cores (e.g., tens, or even hundreds of processing cores). Processor cores 308a, 308b, 308c may be implemented on a single integrated circuit (IC) chip. Moreover, the chip may include one or more shared and/or private caches, buses or interconnections, graphics and/or memory controllers, or other components.

In some embodiments, processor 304 includes cache 306. In an example, sections of cache 306 may be dedicated to individual cores 308 (e.g., a first section of cache 306 dedicated to core 308a, a second section of cache 306 dedicated to core 308b, and so on). In an example, one or more sections of cache 306 may be shared among two or more of cores 308. Cache 306 may be split in different levels (e.g., level 1 (L1) cache, level 2 (L2) cache, level 3 (L3) cache, and the like).

In some embodiments, processor core 304 may include a fetch unit to fetch instructions (including instructions with conditional branches) for execution by the core 304. The instructions may be fetched from any storage devices such as the memory 330. Processor core 304 may also include a decode unit to decode the fetched instruction. For example, the decode unit may decode the fetched instruction into a plurality of micro-operations. Processor core 304 may include a schedule unit to perform various operations associated with storing decoded instructions. For example, the schedule unit may hold data from the decode unit until the instructions are ready for dispatch (e.g., until all source values of a decoded instruction become available). In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (e.g., an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 304 may be an out-of-order processor core in one embodiment. Processor core 304 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 304 may also include a bus unit to enable communication between components of processor core 304 and other components via one or more buses. Processor core 304 may also include one or more registers to store data accessed by various components of the core 304 (e.g., values related to assigned app priorities and/or sub-system states (modes) association.

In some embodiments, device 300 comprises connectivity circuitries 331. For example, connectivity circuitries 331 includes hardware devices (e.g., wireless and/or wired connectors and communication hardware) and/or software components (e.g., drivers, protocol stacks) to enable device 300 to communicate with external devices. Device 300 may be separate from the external devices, such as other computing devices, wireless access points or base stations, etc.

In an example, connectivity circuitries 331 may include multiple different types of connectivity. To generalize, the connectivity circuitries 331 may include cellular connectivity circuitries, wireless connectivity circuitries, etc. Cellular connectivity circuitries of connectivity circuitries 331 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 331 refers to wireless connectivity that is not cellular, and can include personal area networks (e.g., Bluetooth, Near Field, etc.), local area networks (e.g., e.g., Wi-Fi), and/or wide area networks (e.g., WiMax), and/or other wireless communication. In an example, connectivity circuitries 331 may include a network interface, such as a wired or wireless interface so that a system embodiment may be incorporated into a wireless device, for example, a cell phone or personal digital assistant.

In some embodiments, device 300 comprises control hub 332, which represents hardware devices and/or software components related to interaction with one or more I/O devices. For example, processor 304 may communicate with one or more of display 322, one or more peripheral devices 324, storage devices 328, one or more other external devices 329, etc., via control hub 332. Control hub 332 may be a chipset, a Platform Control Hub (PCH), and/or the like.

For example, control hub 332 illustrates one or more connection points for additional devices that connect to device 300 (e.g., through which a user might interact with the system). For example, devices 329 that can be attached to device 300 include microphone devices, speaker or stereo systems, audio devices, video systems or other display devices, keyboard or keypad devices, or other I/O devices for use with specific applications such as card readers or other devices.

As mentioned above, control hub 332 can interact with audio devices, display 322, etc. For example, input through a microphone or other audio device can provide input or commands for one or more applications or functions of device 300. Additionally, audio output can be provided instead of, or in addition to display output. In another example, if display 322 includes a touch screen, display 322 also acts as an input device, which can be at least partially managed by control hub 332. There can also be additional buttons or switches on computing device 300 to provide I/O functions managed by control hub 332. In one embodiment, control hub 332 manages devices such as accelerometers, cameras, light sensors or other environmental sensors, or other hardware that can be included in device 300. The input can be part of direct user interaction, as well as providing environmental input to the system to influence its operations (e.g., filtering for noise, adjusting displays for brightness detection, applying a flash for a camera, or other features).

In some embodiments, control hub 332 may couple to various devices using any appropriate communication protocol (e.g., Peripheral Component Interconnect Express (PCIe), Universal Serial Bus (USB), Thunderbolt, High Definition Multimedia Interface (HDMI), Firewire, etc.

In some embodiments, display 322 represents hardware (e.g., display devices) and software (e.g., drivers) components that provide a visual and/or tactile display for a user to interact with device 300. Display 322 may include a display interface, a display screen, and/or hardware device used to provide a display to a user. In some embodiments, display 322 includes a touch screen (or touch pad) device that provides both output and input to a user. In an example, display 322 may communicate directly with the processor 304. Display 322 can be one or more of an internal display device, as in a mobile electronic device or a laptop device or an external display device attached via a display interface (e.g., DisplayPort, HDMI, etc.). In one embodiment display 322 can be a head mounted display (HMD) such as a stereoscopic display device for use in virtual reality (VR) applications or augmented reality (AR) applications.

In some embodiments, and although not illustrated in the figure, in addition to (or instead of) processor 304, device 300 may include Graphics Processing Unit (GPU) comprising one or more graphics processing cores, which may control one or more aspects of displaying contents on display 322.

Control hub 332 (or platform controller hub) may include hardware interfaces and connectors, as well as software components (e.g., drivers, protocol stacks) to make peripheral connections to peripheral devices 324.

It will be understood that device 300 could both be a peripheral device to other computing devices, as well as have peripheral devices connected to it. Device 300 may have a "docking" connector to connect to other computing devices for purposes such as managing (e.g., downloading and/or uploading, changing, synchronizing) content on device 300. Additionally, a docking connector can allow device 300 to connect to certain peripherals that allow computing device 300 to control content output, for example, to audiovisual or other systems.

In addition to a proprietary docking connector or other proprietary connection hardware, device 300 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 331 may be coupled to control hub 332 in addition to, or instead of, being coupled directly to the processor 304. In some embodiments, display 322 may be coupled to control hub 332 in addition to, or instead of, being coupled directly to processor 304.

In some embodiments, device 300 comprises memory 330 coupled to processor 304 via memory interface 334. Memory 330 includes memory devices for storing information in device 300.

In some embodiments, memory 330 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 330 can be a dynamic random-access memory (DRAM) device, a static random-access memory (SRAM) device, flash memory device, phase-change memory device, or some other memory device having suitable performance to serve as process memory. In one embodiment, memory 330 can operate as system memory for device 300, to store data and instructions for use when the one or more processors 304 executes an application or process. Memory 330 can store application data, user data, music, photos, documents, or other data, as well as system data (whether long-term or temporary) related to the execution of the applications and functions of device 300.

Elements of various embodiments and examples are also provided as a machine-readable medium (e.g., memory 330) for storing the computer-executable instructions (e.g., instructions to implement any other processes discussed herein). The machine-readable medium (e.g., memory 330) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS, UEFI, or other firmware) which may be transferred from a remote computer (e.g., a server) to a requesting computer (e.g., a client) by way of data signals via a communication link (e.g., a modem or network connection).

In some embodiments, device 300 comprises temperature measurement circuitries 340 for measuring temperature of various components of device 300. In an example, temperature measurement circuitries 340 may be embedded, or coupled or attached to various components, whose temperature are to be measured and monitored. For example, temperature measurement circuitries 340 may measure temperature of (or within) one or more of cores 308a, 308b, 308c, voltage regulator 314, memory 330, a mother-board of SoC 301, and/or any appropriate component of device 300.

In some embodiments, device 300 comprises power measurement circuitries 342 for measuring power consumed by one or more components of the device 300. In some embodiments, the power measurement circuitries 342 may be similar to, for example, power failure detection logic 110. In an example, in addition to, or instead of, measuring power, the power measurement circuitries 342 may measure voltage and/or current. In an example, the power measurement circuitries 342 may be embedded, or coupled or attached to various components, whose power, voltage, and/or current consumption are to be measured and monitored. For example, power measurement circuitries 342 may measure power, current and/or voltage supplied by one or more voltage regulators 314, power supplied to SoC 301, power supplied to device 300, power consumed by processor 304 (or any other component) of device 300, etc.

In some embodiments, device 300 comprises one or more voltage regulator circuitries, generally referred to as voltage regulator (VR) 314. VR 314 generates signals at appropriate voltage levels, which may be supplied to operate any appropriate components of the device 300. Merely as an example, VR 314 is illustrated to be supplying signals to processor 304 of device 300. In some embodiments, VR 314 receives one or more Voltage Identification (VID) signals, and generates the voltage signal at an appropriate level, based on the VID signals. Various type of VRs may be utilized for the VR

314. For example, VR 314 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 310*a/b* and/or PMIC 312. In some embodiments, each core has a network of distributed LDOs to provide efficient control for power management. The LDOs can be digital, analog, or a combination of digital or analog LDOs. In some embodiments, VR 314 includes current tracking apparatus to measure current through power supply rail(s).

In some embodiments, device 300 comprises one or more clock generator circuitries, generally referred to as clock generator 316. Clock generator 316 generates clock signals at appropriate frequency levels, which may be supplied to any appropriate components of device 300. Merely as an example, clock generator 316 is illustrated to be supplying clock signals to processor 304 of device 300. In some embodiments, clock generator 316 receives one or more Frequency Identification (FID) signals, and generates the clock signals at an appropriate frequency, based on the FID signals.

In some embodiments, device 300 comprises battery 318 supplying power to various components of device 300. Merely as an example, battery 318 is illustrated to be supplying power to processor 304. Although not illustrated in the figures, device 300 may comprise a charging circuitry to recharge the battery, based on Alternating Current (AC) power supply received from an AC adapter.

In some embodiments, device 300 comprises Power Control Unit (PCU) 310 (also referred to as Power Management Unit (PMU), Power Controller, etc.). In an example, some sections of PCU 310 may be implemented by one or more processing cores 308, and these sections of PCU 310 are symbolically illustrated using a dotted box and labelled PCU 310*a*. In an example, some other sections of PCU 310 may be implemented outside the processing cores 308, and these sections of PCU 310 are symbolically illustrated using a dotted box and labelled as PCU 310*b*. PCU 310 may implement various power management operations for device 300. PCU 310 may include hardware interfaces, hardware circuitries, connectors, registers, etc., as well as software components (e.g., drivers, protocol stacks), to implement various power management operations for device 300.

In some embodiments, device 300 comprises Power Management Integrated Circuit (PMIC) 312 to implement various power management operations for device 300. In some embodiments, PMIC 312 is a Reconfigurable Power Management ICs (RPMICs) and/or an IMVP (Intel® Mobile Voltage Positioning). In an example, the PMIC is within an IC chip separate from processor 304. The may implement various power management operations for device 300. PMIC 312 may include hardware interfaces, hardware circuitries, connectors, registers, etc., as well as software components (e.g., drivers, protocol stacks), to implement various power management operations for device 300. For example, in some embodiments the PMIC (and/or PCU 310) may include the interrupt control block 115.

In an example, device 300 comprises one or both PCU 310 or PMIC 312. In an example, any one of PCU 310 or PMIC 312 may be absent in device 300, and hence, these components are illustrated using dotted lines.

Various power management operations of device 300 may be performed by PCU 310, by PMIC 312, or by a combination of PCU 310 and PMIC 312. For example, PCU 310 and/or PMIC 312 may select a power state (e.g., P-state) for various components of device 300. For example, PCU 310 and/or PMIC 312 may select a power state (e.g., in accordance with [ACPI]) for various components of device 300. Merely as an example, PCU 310 and/or PMIC 312 may cause various components of the device 300 to transition to a sleep state, to an active state, to an appropriate C state (e.g., C0 state, or another appropriate C state, in accordance with the [ACPI]), and the like. In an example, PCU 310 and/or PMIC 312 may control a voltage output by VR 314 and/or a frequency of a clock signal output by the clock generator (e.g., by outputting the VID signal and/or the FID signal, respectively. In an example, PCU 310 and/or PMIC 312 may control battery power usage, charging of battery 318, and features related to power saving operation.

The clock generator 316 can comprise a phase locked loop (PLL), frequency locked loop (FLL), or any suitable clock source. In some embodiments, each core of processor 304 has its own clock source. As such, each core can operate at a frequency independent of the frequency of operation of the other core. In some embodiments, PCU 310 and/or PMIC 312 performs adaptive or dynamic frequency scaling or adjustment. For example, clock frequency of a processor core can be increased if the core is not operating at its maximum power consumption threshold or limit. In some embodiments, PCU 310 and/or PMIC 312 determines the operating condition of each core of a processor, and opportunistically adjusts frequency and/or power supply voltage of that core without the core clocking source (e.g., PLL of that core) losing lock when the PCU 310 and/or PMIC 312 determines that the core is operating below a target performance level. For example, if a core is drawing current from a power supply rail less than a total current allocated for that core or processor 304, then PCU 310 and/or PMIC 312 can temporality increase the power draw for that core or processor 304 (e.g., by increasing clock frequency and/or power supply voltage level) so that the core or processor 304 can perform at higher performance level. As such, voltage and/or frequency can be increased temporality for processor 304 without violating product reliability.

In an example, PCU 310 and/or PMIC 312 may perform power management operations (e.g., based at least in part on receiving measurements from power measurement circuitries 342, temperature measurement circuitries 340, charge level of battery 318, and/or any other appropriate information that may be used for power management. To that end, PMIC 312 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 310 and/or PMIC 312 in at least one embodiment to allow PCU 310 and/or PMIC 312 to manage processor core energy at least in part based on value(s) detected by one or more of the sensors.

Also illustrated is an example software stack of device 300 (although not all elements of the software stack are illustrated). Merely as an example, processors 304 may execute application programs 350, Operating System 352, one or more Power Management (PM) specific application programs (e.g., generically referred to as PM applications 358), and/or the like. PM applications 358 may also be executed by the PCU 310 and/or PMIC 312. OS 352 may also include one or more PM applications 356a, 356b, 356c. The OS 352 may also include various drivers 354a, 354b, 354c, etc., some of which may be specific for power management purposes. In some embodiments, device 300 may further comprise a Basic Input/output System (BIOS) 320, which may be similar to firmware 120. BIOS 320 may communicate with OS 352 (e.g., via one or more drivers 354), communicate with processors 304, etc. In some embodiments, the BIOS 320 may be replaced by, be associated with, or be part of another type of firmware such as an ACPI firmware element, a UEFI firmware element, or some other firmware element as described above.

For example, one or more of PM applications 358, 356, drivers 354, BIOS 320, etc. may be used to implement power management specific tasks (e.g., to control voltage and/or frequency of various components of device 300, to control wake-up state, sleep state, and/or any other appropriate power state of various components of device 300, control battery power usage, charging of the battery 318, features related to power saving operation, etc.

In some embodiments, battery 318 is a Li-metal battery with a pressure chamber to allow uniform pressure on a battery. The pressure chamber is supported by metal plates (e.g., pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 310a/b has a capability to enable extra compute and telemetries resources for the runtime support of the pCode. Here pCode refers to a firmware executed by PCU 310a/b to manage performance of the SoC 301. For example, pCode may set frequencies and appropriate voltages for the processor. Part of the pCode are accessible via OS 352. In various embodiments, mechanisms and methods are provided that dynamically change an Energy Performance Preference (EPP) value based on workloads, user behavior, and/or system conditions. There may be a well-defined interface between OS 352 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 352 by including machine-learning support as part of OS 352 and either tuning the EPP value that the OS hints to the hardware (e.g., various components of SoC 301) by machine-learning prediction, or by delivering the machine-learning prediction to the pCode in a manner similar to that done by a Dynamic Tuning Technology (DTT) driver. In this model, OS 352 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 352 and the other from software such as DTT, and may selectively choose to provide higher performance and/or responsiveness. As part of this method, the pCode may enable in the DTT an option to tune its reaction for the DTT for different types of activity.

Figure 4:
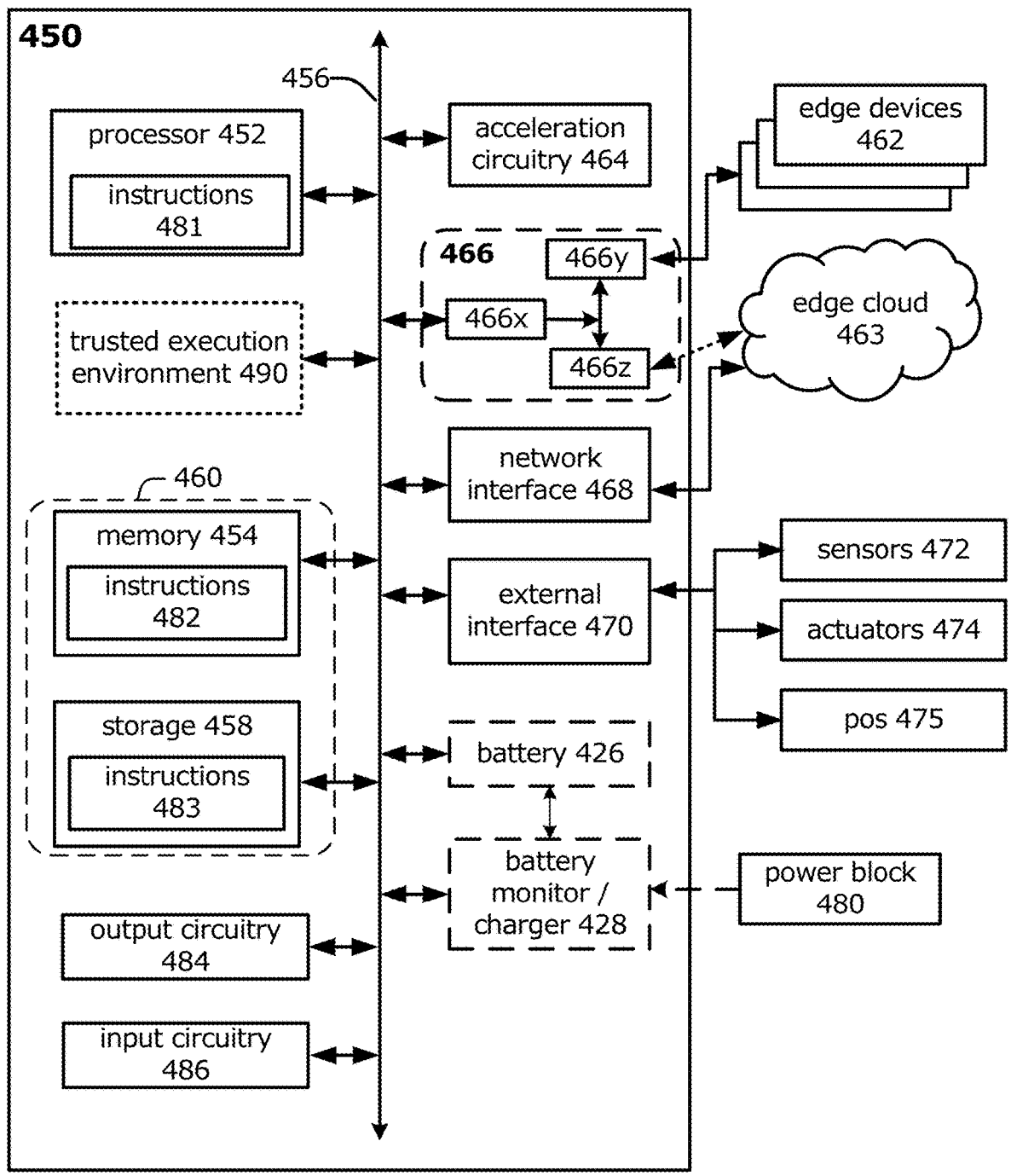
FIG. 4 illustrates example components of various compute nodes, which may be used in edge computing system(s), in accordance with some embodiments.

FIG. 4 illustrates an example of components that may be present in a computing node 450 for implementing the techniques (e.g., operations, processes, methods, and methodologies) described herein. The compute node 450 provides a closer view of the respective components of node 400 when implemented as or as part of a computing device (e.g., as a mobile device, a base station, server, gateway, etc.). The compute node 450 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 450, or as components otherwise incorporated within a chassis of a larger system.

Figure 5:
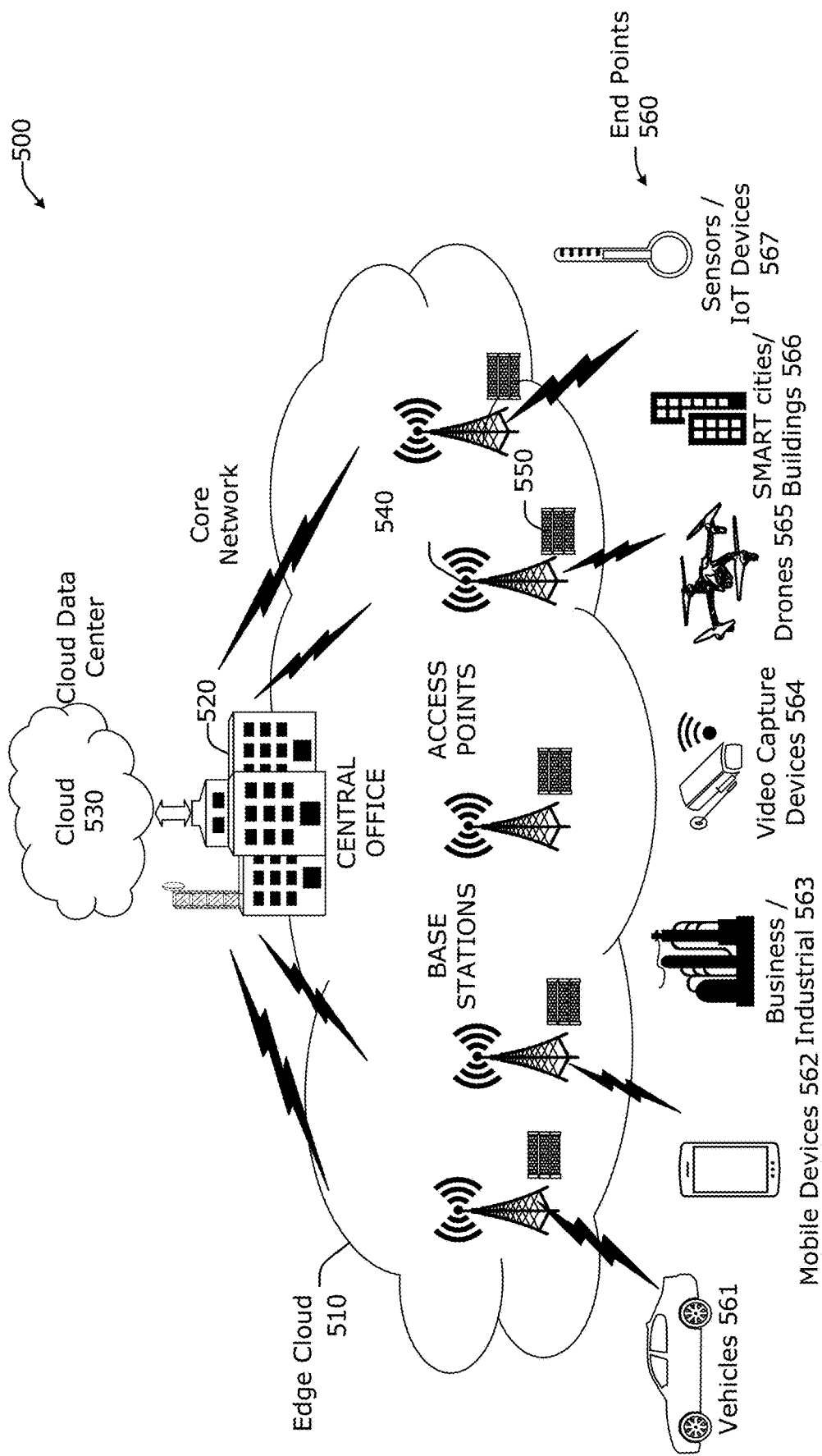
FIG. 5 illustrates an overview of an edge cloud configuration for edge computing, in accordance with some embodiments.
Figure 6:
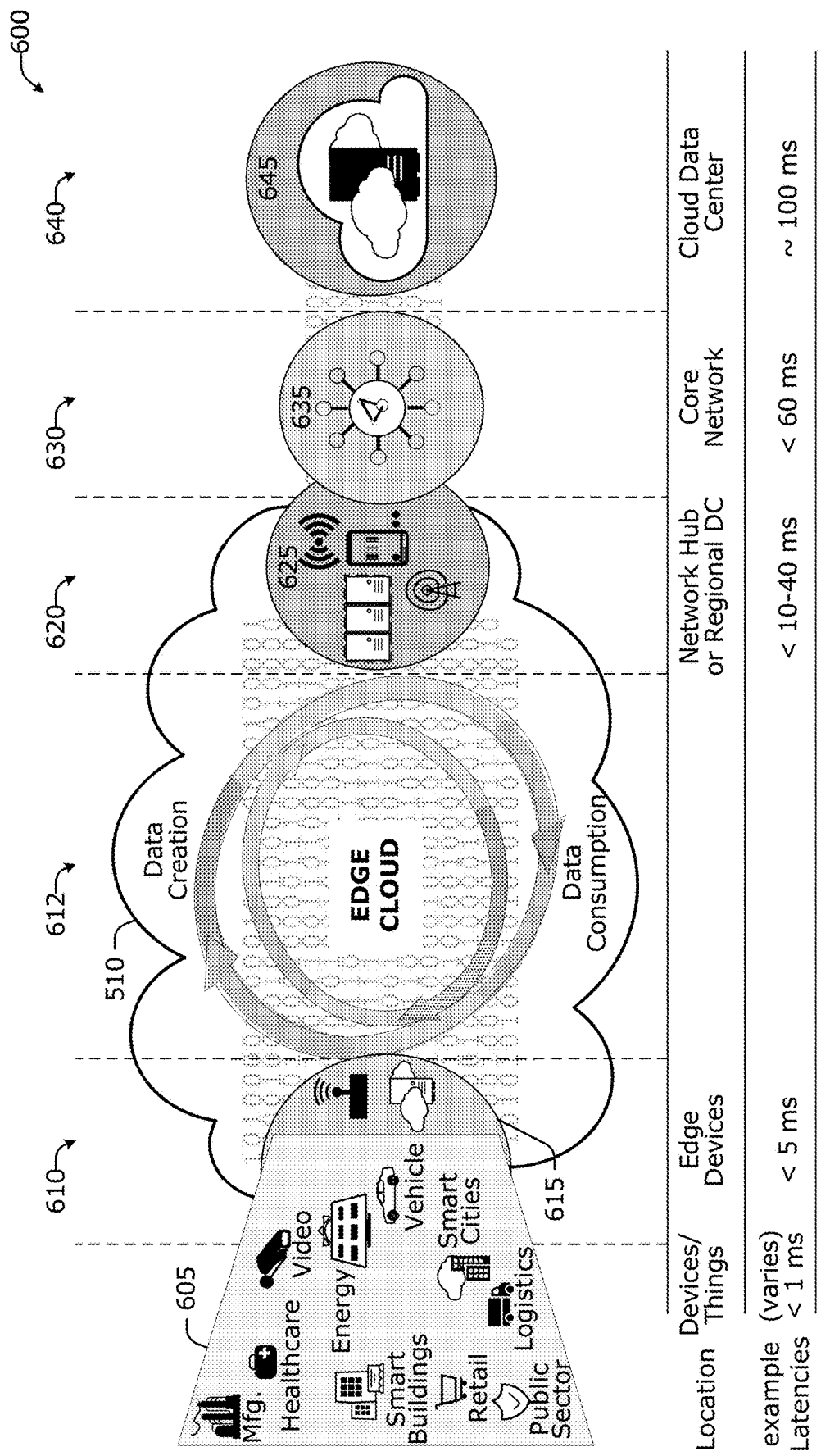
FIG. 6 illustrates operational layers among endpoints, an edge cloud, and cloud computing environments, in accordance with some embodiments.

In some embodiments, compute node 450 may correspond to the electronic device of FIG. 1; the device 300 of FIG. 3; an edge node in edge cloud 510, NAN 540, processing hub 550, central office device(s) 520, and/or the data sources 560 of FIG. 5; endpoint devices 605, network equipment 625, systems/devices of the core network data center 635, and/or systems/devices of the cloud data center 645 of FIG. 6; and/or any other component, device, and/or system discussed herein. The compute node 450 may be embodied as a type of device, appliance, computer, or other "thing" capable of communicating with other edge, networking, or endpoint components. For example, compute node 450 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 450 includes processing circuitry in the form of one or more processors 452. The processor circuitry 452 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 452 may include one or more hardware accelerators (e.g., same or similar to acceleration circuitry 464), which may be microprocessors, programmable processing devices (e.g., FPGA, ASIC, etc.), or the like. The one or more accelerators may include, for example, computer vision and/or deep learning accelerators. In some implementations, the processor circuitry 452 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 452 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 452 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 452 may work in coordination with each other to execute many types of operations and instructions within and on behalf of the compute node 450.

The processors (or cores) 452 may be coupled with or may include memory/storage and may be configured to execute instructions stored in the memory/storage to enable various applications or operating systems to run on the platform 450. The processors (or cores) 452 is configured to operate application software to provide a specific service to a user of the platform 450. Additionally or alternatively, the processor(s) 452 may be a special-purpose processor(s)/controller(s) configured (or configurable) to operate according to the elements, features, and implementations discussed herein.

As examples, the processor(s) 452 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 452 may be a part of a system on a chip (SoC), System-in-Package (SiP), a multi-chip package (MCP), and/or the like, in which the processor(s) 452 and other components are formed into a single integrated circuit, or a single package, such as the Edison™ or Galileo™ SoC boards from Intel® Corporation. Other examples of the processor(s) 452 are mentioned elsewhere in the present disclosure.

The processor(s) 452 may communicate with system memory 454 over an interconnect (IX) 456. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the IX 456. In an example, the storage 458 may be implemented via a solid-state disk drive (SSDD) and/or high-speed electrically erasable memory (commonly referred to as "flash memory"). Other devices that may be used for the storage 458 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 454 and/or storage circuitry 458 may also incorporate three-dimensional (3D) cross-point (XPOINT) memories from Intel® and Micron®.

In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components of edge computing device 450 may communicate over an interconnect (IX) 456. The IX 456 may represent any suitable type of connection or interface such as, for example, metal or metal alloys (e.g., copper, aluminum, etc.), fiber, and/or the like. The IX 456 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, HyperTransport IXs, NVLink provided by NVIDIA®, a Time-Trigger Protocol (TTP) system, a FlexRay system, PROFIBUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 456 may be a proprietary bus, for example, used in a SoC based system.

The IX 456 couples the processor 452 to communication circuitry 466 for communications with other devices, such as a remote server (not shown) and/or the connected edge devices 462. The communication circuitry 466 is a hardware element, or collection of hardware elements, used to communicate over one or more networks (e.g., cloud 463) and/or with other devices (e.g., edge devices 462).

The transceiver 466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 466 (or multiple transceivers) may communicate using multiple standards or radios for communications at a different range. For example, the compute node 450 may communicate with close devices, e.g., within about 10 meters, using a local transceiver based on BLE, or another low power radio, to save power. More distant connected edge devices 462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 466 (e.g., a radio transceiver) may be included to communicate with devices or services in the edge cloud 463 via local or wide area network protocols. The wireless network transceiver 466 may be an LPWA transceiver that follows the IEEE 802.15.4, or IEEE 802.15.4g standards, among others. The compute node 463 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 466, as described herein. For example, the transceiver 466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 466 may include radios that are compatible with any number of 3GPP specifications, such as LTE and 5G/NR communication systems, discussed in further detail at the end of the present disclosure. A network interface controller (NIC) 468 may be included to provide a wired communication to nodes of the edge cloud 463 or to other devices, such as the connected edge devices 462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 468 may be included to enable connecting to a second network, for example, a first NIC 468 providing communications to the cloud over Ethernet, and a second NIC 468 providing communications to other devices over another type of network.

Given the variety of types of applicable communications from the device to another component or network, applicable communications circuitry used by the device may include or be embodied by any one or more of components 464, 466, 468, or 470. Accordingly, in various examples, applicable means for communicating (e.g., receiving, transmitting, etc.) may be embodied by such communications circuitry.

The compute node 450 may include or be coupled to acceleration circuitry 464, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 464 may comprise logic blocks or logic fabric and other interconnected resources that may be programmed (configured) to perform various functions, such as the procedures, methods, functions, etc. discussed herein. In such implementations, the acceleration circuitry 464 may also include memory cells (e.g., EPROM, EEPROM, flash memory, static memory (e.g., SRAM, anti-fuses, etc.) used to store logic blocks, logic fabric, data, etc. in LUTs and the like.

The IX 456 also couples the processor 452 to a sensor hub or external interface 470 that is used to connect additional devices or subsystems. The additional/external devices may include sensors 472, actuators 474, and positioning circuitry 475.

The sensor circuitry 472 includes devices, modules, or subsystems whose purpose is to detect events or changes in its environment and send the information (sensor data) about the detected events to some other a device, module, subsystem, etc. Examples of such sensors 472 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 450); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 474, allow platform 450 to change its state, position, and/or orientation, or move or control a mechanism or system. The actuators 474 comprise electrical and/or mechanical devices for moving or controlling a mechanism or system, and converts energy (e.g., electric current or moving air and/or liquid) into some kind of motion. The actuators 474 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 474 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 450 may be configured to operate one or more actuators 474 based on one or more captured events and/or instructions or control signals received from a service provider and/or various client systems.

The positioning circuitry 475 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 475 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 475 may include a Micro-Technology for Positioning, Navigation, and Timing (Micro-PNT) IC that uses a primary timing clock to perform position tracking/estimation without GNSS assistance. The positioning circuitry 475 may also be part of, or interact with, the communication circuitry 466 to communicate with the nodes and components of the positioning network. The positioning circuitry 475 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 475 is, or includes an INS, which is a system or device that uses sensor circuitry 472 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 450 without the need for external references.

In some optional examples, various input/output (I/O) devices may be present within or connected to, the compute node 450, which are referred to as input circuitry 486 and output circuitry 484 in FIG. 4. The input circuitry 486 and output circuitry 484 include one or more user interfaces designed to enable user interaction with the platform 450 and/or peripheral component interfaces designed to enable peripheral component interaction with the platform 450. Input circuitry 486 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 484 may be included to show information or otherwise convey information, such as sensor readings, actuator position(s), or other like information. Data and/or graphics may be displayed on one or more user interface components of the output circuitry 484. Output circuitry 484 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 450. The output circuitry 484 may also include speakers or other audio emitting devices, printer(s), and/or the like. Additionally or alternatively, the sensor circuitry 472 may be used as the input circuitry 484 (e.g., an image capture device, motion capture device, or the like) and one or more actuators 474 may be used as the output device circuitry 484 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 476 may power the compute node 450, although, in examples in which the compute node 450 is mounted in a fixed location, it may have a power supply coupled to an electrical grid, or the battery may be used as a backup or for temporary capabilities. The battery 476 may be a lithium ion battery, or a metal-air battery, such as a zinc-air battery, an aluminum-air battery, a lithium-air battery, and the like.

A battery monitor/charger 478 may be included in the compute node 450 to track the state of charge (SoCh) of the battery 476, if included. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 478 may communicate the information on the battery 476 to the processor 452 over the IX 456. The battery monitor/charger 478 may also include an analog-to-digital (ADC) converter that enables the processor 452 to directly monitor the voltage of the battery 476 or the current flow from the battery 476. The battery parameters may be used to determine actions that the compute node 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the compute node 450. A wireless battery charging circuit, such as an LTC4020 chip from Linear Technologies of Milpitas, California, among others, may be included in the battery monitor/charger 478. The specific charging circuits may be selected based on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 483 in the form of software, firmware, or hardware commands to implement the techniques described herein. Although such instructions 482, 483 are shown as code blocks included in the memory 454 and the storage 458, any of the code blocks 482, 483 may be replaced with hardwired circuits, for example, built into an application specific integrated circuit (ASIC) or programmed into an FPGA, or the like.

In an example, the instructions 481, 482, 483 provided via the memory 454, the storage 458, or the processor 452 may be embodied as a non-transitory machine-readable medium (NTMRM) 460 including code to direct the processor 452 to perform electronic operations in the compute node 450. The processor 452 may access the NTMRM 460 over the IX 456. For instance, the NTMRM 460 may be embodied by devices described for the storage 458 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 460 may include instructions to direct the processor 452 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 481, 482, 483) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 481, 482, 483 for carrying out operations of the present disclosure may also be written in any combination of the programming languages discussed herein. The program code may execute entirely on the system 450, partly on the system 450, as a stand-alone software package, partly on the system 450 and partly on a remote computer or entirely on the remote computer or server. In the latter scenario, the remote computer may be connected to the system 450 through any type of network, including a LAN or WAN, or the connection may be made to an external computer (e.g., through the Internet using an Internet Service Provider).

In an example, the instructions 481, 482, 483 on the processor circuitry 452 (separately, or in combination with the instructions 481, 482, 483) may configure execution or operation of a trusted execution environment (TEE) 490. The TEE 490 operates as a protected area accessible to the processor circuitry 402 to enable secure access to data and secure execution of instructions. In some embodiments, the TEE 490 may be a physical hardware device that is separate from other components of the system 450 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 490 may be implemented as secure enclaves, which are isolated regions of code and/or data within the processor and/or memory/storage circuitry of the system 450. Only code executed within a secure enclave may access data within the same secure enclave, and the secure enclave may only be accessible using the secure application (which may be implemented by an application processor or a tamper-resistant microcontroller). Various implementations of the TEE 490, and an accompanying secure area in the processor circuitry 452 or the memory circuitry 454 and/or storage circuitry 458 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 400 through the TEE 490 and the processor circuitry 452. Additionally or alternatively, the memory circuitry 454 and/or storage circuitry 458 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 404 and/or storage circuitry 408 may be divided into one or more trusted memory regions for storing applications or software modules of the TEE 490.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 4 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 4 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 5 is a block diagram 500 showing an overview of a configuration for edge computing, which includes a layer of processing referred to in many of the following examples as an "edge cloud". As shown, the edge cloud 510 is co-located with a network access node (NAN) 540 (e.g., an access point or base station) at an edge location, a local processing hub 550, or a central office 520, and thus may include multiple entities, devices, and equipment instances. The edge cloud 510 is located much closer to the endpoint (consumer and producer) data sources 560 (e.g., autonomous vehicles 561, user equipment 562, business and industrial equipment 563, video capture devices 564, drones 565, smart cities and building devices 566, sensors and IoT devices 567, etc.) than the cloud data center 530. Compute, memory, and storage resources which are offered at the edges in the edge cloud 510 are critical to providing ultra-low latency response times for services and functions used by the endpoint data sources 560 as well as reduce network backhaul traffic from the edge cloud 510 toward cloud data center 530 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

FIG. 6 illustrates operational layers among endpoints, an edge cloud, and cloud computing environments. Specifically, FIG. 6 depicts examples of computational use cases 600, utilizing the edge cloud 510 among multiple illustrative layers of network computing. The layers begin at an endpoint (devices and things) layer 605, which accesses the edge cloud 510 to conduct data creation, analysis, and data consumption activities. The edge cloud 510 may span multiple network layers, such as an edge devices layer 610 having gateways, on-premise servers, or network equipment (nodes 615) located in physically proximate edge systems; a network access layer 620, encompassing base stations, radio processing units, network hubs, regional data centers (DC), or local network equipment 625; and any equipment, devices, or nodes located therebetween (in layer 612, not illustrated in detail). The network communications within the edge cloud 510 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 600, under 5 ms at the edge devices layer 610, to even between 10 to 40 ms when communicating with nodes at the network access layer 620. Beyond the edge cloud 510 are core network 630 and cloud data center 640 layers, each with increasing latency (e.g., between 50-60 ms at the core network layer 630, to 100 or more ms at the cloud data center layer). As a result, operations at a core network data center 635 or a cloud data center 645, with latencies of at least 50 to 100 ms or more, will not be able to accomplish many time-critical functions of the use cases 605. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 635 or a cloud data center 645, a central office or content data network may be considered as being located within a "near edge" layer ("near" to the cloud, having high latency values when communicating with the devices and endpoints of the use cases 605), whereas an access point, base station, on-premise server, or network gateway may be considered as located within a "far edge" layer ("far" from the cloud, having low latency values when communicating with the devices and endpoints of the use cases 605). It will be understood that other categorizations of a particular network layer as constituting a "close", "local", "near", "middle", or "far" edge may be based on latency, distance, number of network hops, or other measurable characteristics, as measured from a source in any of the network layers 600-640.

The various use cases 605 may access resources under usage pressure from incoming streams, due to multiple services utilizing the edge cloud. To achieve results with low latency, the services executed within the edge cloud 510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 510 may provide the ability to serve and respond to multiple applications of the use cases 605 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 510 (network layers 600-640), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 510.

As such, the edge cloud 510 is formed from network components and functional features operated by and within edge gateway nodes, edge aggregation nodes, or other edge compute nodes among network layers 610-630. The edge cloud 510 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 510 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 510 and/or any other systems discussed herein may be servers, appliances, network infrastructure, machines, robots, drones, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 4. The edge cloud 510 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Some non-limiting Examples of various embodiments are presented below.

Example 1 includes one or more non-transitory computer-readable media comprising instructions that, upon execution of the instructions by a power control unit (PCU) of an electronic device, are to cause the PCU to: receive a (or, identify a received) power failure interrupt from an interrupt control block of the electronic device, wherein the power failure interrupt is generated based on a power failure of the electronic device; and in response to receipt of the power failure interrupt and when a threshold number of processor cores related to the power failure is different than a number of awake processor cores of a set of processor cores of the electronic device, transition a subset of processor cores of the set of processor cores to an awake state or a sleep state so that the number of awake processor cores is same as the threshold number of processor cores.

Example 2 includes the one or more non-transitory computer-readable media of example 1, and/or some other example herein, wherein the threshold number of processor cores is less than a number of processor cores in the set of processor cores.

Example 3 includes the one or more non-transitory computer-readable media of any of examples 1-2, and/or some other example herein, wherein the awake state is a C0 state.

Example 4 includes the one or more non-transitory computer-readable media of any of examples 1-3, and/or some other example herein, wherein the sleep state is a C6 state.

Example 5 includes the one or more non-transitory computer-readable media of any of examples 1-4, and/or some other example herein, wherein the instructions are to cause the PCU to not wake processor cores of the set of process cores that are in the sleep state prior to identifying whether the threshold number of processor cores is different than the number of awake processor cores.

Example 6 includes the one or more non-transitory computer-readable media of any of examples 1-5, and/or some other example herein, wherein the threshold number of processor cores is based on a pre-defined or configurable value stored in firmware (e.g., a BIOS, a UEFI-related element, an ACPI-related element, etc.) of the electronic device.

Example 7 includes the one or more non-transitory computer-readable media of any of examples 1-6, and/or some other example herein wherein the transition of the subset of processor cores to the awake state or the sleep state is to cause the awake processor cores to perform one or more survivability functions related to the power failure of the electronic device.

Example 8 includes the one or more non-transitory computer-readable media of example 7, and/or some other example herein, wherein the one or more survivability functions include one or more of a last level cache (LLC) flush, a cache flush, a memory controller management function, or a memory refresh function.

Example 9 includes the one or more non-transitory computer-readable media of any of examples 1-8, and/or some other example herein, wherein the instructions are to cause the PCU to: receive a (or, identify a received) power failure indication from power failure detection logic, wherein the power failure indication indicates the power failure of the electronic device; and decline to process, based on receipt of the power failure indication, an interrupt that is different than the power failure interrupt received from the interrupt control block.

Example 10 includes the one or more non-transitory computer-readable media of any of examples 1-9, and/or some other example herein, wherein the interrupt is related to an asynchronous dynamic random access memory (DRAM) refresh (ADR) reflow.

Example 11 includes an electronic device comprising: an interrupt control block; a plurality of processor cores; and a power control unit (PCU) communicatively coupled with the interrupt control block and the plurality of processor cores, wherein the PCU is to: receive a (or, identify a received) power failure interrupt from the interrupt control block, wherein the power failure interrupt is generated based on a power failure of the electronic device; and in response to receipt of the power failure interrupt and when a threshold number of processor cores related to the power failure is different than a number of awake processor cores of a set of processor cores of the electronic device, transition a subset of processor cores of the set of processor cores to an awake state or a sleep state so that the number of awake processor cores is same as the threshold number of processor cores.

Example 12 includes the electronic device of example 11 and/or some other example herein, wherein the threshold number of processor cores is less than a number of processor cores in the set of processor cores.

Example 13 includes the electronic device of any of examples 11-12, and/or some other example herein, wherein the awake state is a C0 state.

Example 14 includes the electronic device of any of examples 11-13, and/or some other example herein, wherein the sleep state is a C6 state.

Example 15 includes the electronic device of any of examples 11-14, and/or some other example herein, wherein the PCU is to not wake processor cores of the set of process cores that are in the sleep state prior to identifying whether the threshold number of processor cores is different than the number of awake processor cores.

Example 16 includes the electronic device of any of examples 11-15, and/or some other example herein, further comprising a firmware (e.g., a BIOS, an ACPI-related element, a UEFI-related element, or some other firmware element) communicatively coupled with the PCU, wherein the threshold number of processor cores is based on a pre-defined or configurable value stored in the BIOS.

Example 17 includes the electronic device of any of examples 11-16, and/or some other example herein, wherein the transition of the subset of processor cores to the awake state or the sleep state is to cause the awake processor cores to perform one or more survivability functions related to the power failure of the electronic device.

Example 18 includes the electronic device of example 17, and/or some other example herein, wherein the one or more survivability functions include one or more of a last level cache (LLC) flush, a cache flush, a memory controller management function, or a memory refresh function.

Example 19 includes the one or more non-transitory computer-readable media of any of examples 11-18, and/or some other example herein, wherein the PCU is to: receive a (or, identify a received) power failure indication from power failure detection logic, wherein the power failure indication indicates the power failure of the electronic device; and decline to process, based on receipt of the power failure indication, an interrupt that is different than the power failure interrupt received from the interrupt control block.

Example 20 includes the one or more non-transitory computer-readable media of any of examples 11-12, and/or some other example herein, wherein the power failure interrupt is related to an asynchronous dynamic random access memory (DRAM) refresh (ADR) reflow.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. One or more non-transitory computer-readable media comprising instructions that, upon execution of the instructions by a power control unit (PCU) of an electronic device, are to cause the PCU to at least:
   receive a power failure interrupt from an interrupt control block of the electronic device, wherein the power failure interrupt is generated based on a power failure of the electronic device; and
   in response to receipt of the power failure interrupt, and when a threshold number of processor cores related to the power failure is different than a number of awake processor cores of a set of processor cores of the electronic device, transition a subset of processor cores of the set of processor cores to an awake state or a sleep state so that the number of awake processor cores is same as the threshold number of processor cores.

2. The one or more non-transitory computer-readable media of claim 1, wherein the threshold number of processor cores is less than a number of processor cores in the set of processor cores.

3. The one or more non-transitory computer-readable media of claim 1, wherein the awake state is a C0 state.

4. The one or more non-transitory computer-readable media of claim 1, wherein the sleep state is a C6 state.

5. The one or more non-transitory computer-readable media of claim 1, wherein the instructions are to cause the PCU to not wake processor cores of the set of process cores that are in the sleep state prior to identifying whether the threshold number of processor cores is different than the number of awake processor cores.

6. The one or more non-transitory computer-readable media of claim 1, wherein the threshold number of processor cores is based on a pre-defined or configurable value stored in firmware of the electronic device.

7. The one or more non-transitory computer-readable media of claim 1, wherein the transition of the subset of processor cores to the awake state or the sleep state is to cause the awake processor cores to perform one or more survivability functions related to the power failure of the electronic device.

8. The one or more non-transitory computer-readable media of claim 7, wherein the one or more survivability functions include one or more of a last level cache (LLC) flush, a cache flush, a memory controller management function, or a memory refresh function.

9. The one or more non-transitory computer-readable media of claim 1, wherein the instructions are to cause the PCU to:
receive a power failure indication from power failure detection logic, wherein the power failure indication indicates the power failure of the electronic device; and
decline to process, based on receipt of the power failure indication, an interrupt that is different than the power failure interrupt received from the interrupt control block.

10. The one or more non-transitory computer-readable media of claim 1, wherein the interrupt is related to an asynchronous dynamic random access memory (DRAM) refresh (ADR) reflow.

11. An electronic device comprising:
an interrupt control block;
a plurality of processor cores; and
a power control unit (PCU) communicatively coupled with the interrupt control block and the plurality of processor cores, wherein the PCU is to:
receive a power failure interrupt from the interrupt control block, wherein the power failure interrupt is generated based on a power failure of the electronic device; and
in response to receipt of the power failure interrupt, and when a threshold number of processor cores related to the power failure is different than a number of awake processor cores of a set of processor cores of the electronic device, transition a subset of processor cores of the set of processor cores to an awake state or a sleep state so that the number of awake processor cores is same as the threshold number of processor cores.

12. The electronic device of claim 11, wherein the threshold number of processor cores is less than a number of processor cores in the set of processor cores.

13. The electronic device of claim 11, wherein the awake state is a C0 state.

14. The electronic device of claim 11, wherein the sleep state is a C6 state.

15. The electronic device of claim 11, wherein the PCU is to not wake processor cores of the set of process cores that are in the sleep state prior to identifying whether the threshold number of processor cores is different than the number of awake processor cores.

16. The electronic device of claim 11, including a basic input/output system (BIOS) communicatively coupled with the PCU, wherein the threshold number of processor cores is based on a pre-defined or configurable value stored in the BIOS.

17. The electronic device of claim 11, wherein the transition of the subset of processor cores to the awake state or the sleep state is to cause the awake processor cores to perform one or more survivability functions related to the power failure of the electronic device.

18. The electronic device of claim 17, wherein the one or more survivability functions include one or more of a last level cache (LLC) flush, a cache flush, a memory controller management function, or a memory refresh function.

19. The electronic device of claim 11, wherein the PCU is to:
receive a power failure indication from power failure detection logic, wherein the power failure indication indicates the power failure of the electronic device; and
decline to process, based on receipt of the power failure indication, an interrupt that is different than the power failure interrupt received from the interrupt control block.

20. The electronic device of claim 11, wherein the power failure interrupt is related to an asynchronous dynamic random access memory (DRAM) refresh (ADR) reflow.

* * * * *